May 27, 1952  C. L. HUNSICKER  2,598,387
MOMENTUM CONTROLLED BRAKE FOR FISHING REELS
Filed Sept. 10, 1947  2 SHEETS—SHEET 1
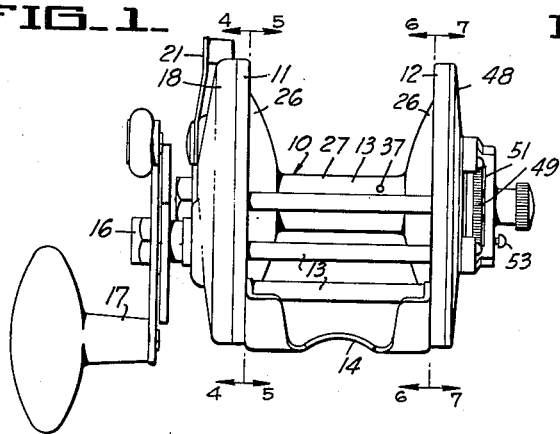
FIG_1_
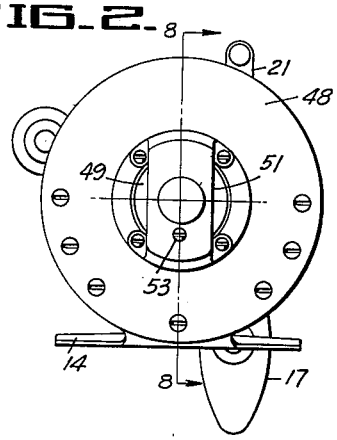
FIG_2_
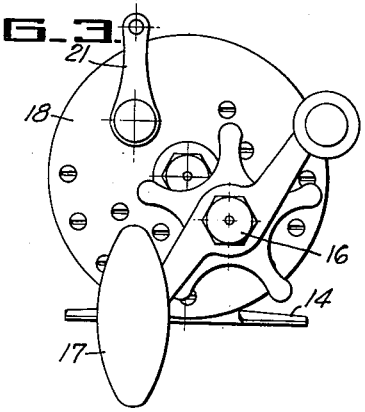
FIG_3_
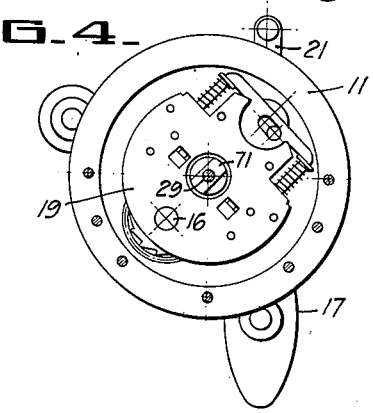
FIG_4_
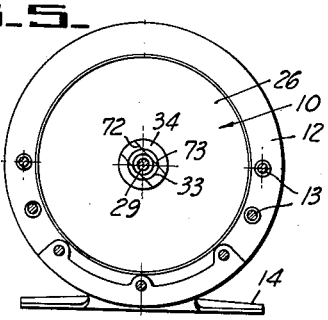
FIG_5_
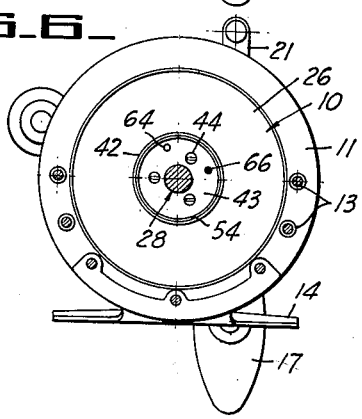
FIG_6_
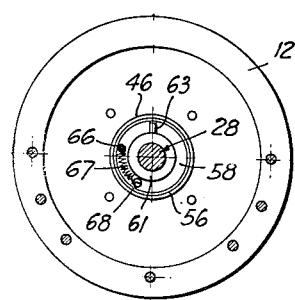
FIG_7_
INVENTOR
Clyde L. Hunsicker
BY Flehr & Swain
ATTORNEYS May 27, 1952        C. L. HUNSICKER        2,598,387
MOMENTUM CONTROLLED BRAKE FOR FISHING REELS
Filed Sept. 10, 1947        2 SHEETS—SHEET 2
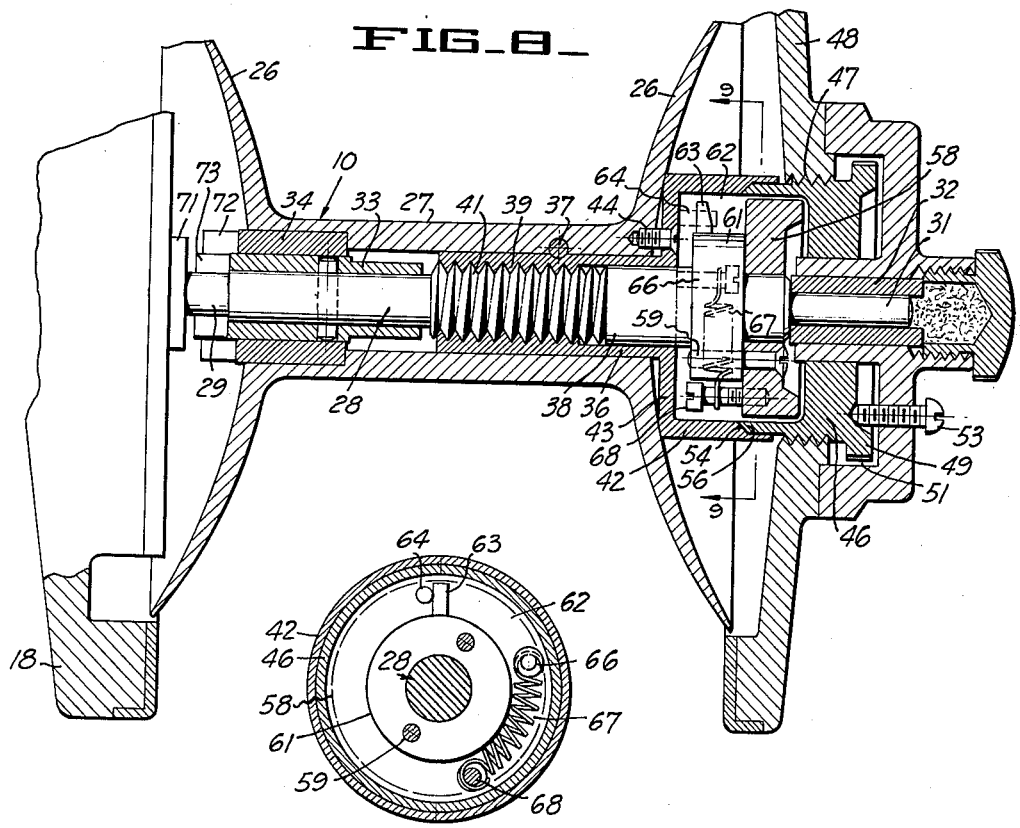
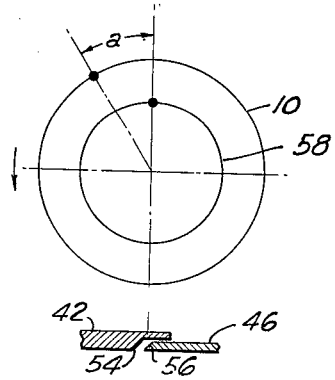
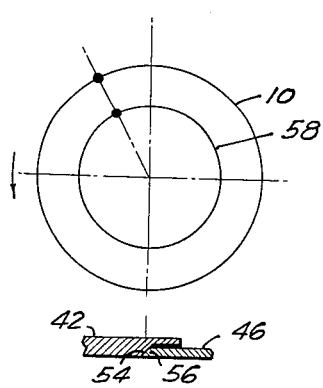
INVENTOR
Clyde L. Hunsicker
BY
Flehr & Swain
ATTORNEYS Patented May 27, 1952

2,598,387

UNITED STATES PATENT OFFICE 2,598,387

MOMENTUM CONTROLLED BRAKE FOR FISHING REELS

Clyde L. Hunsicker, San Francisco, Calif.

Application September 10, 1947, Serial No. 773,195

4 Claims. (Cl. 242—84.5)

This invention relates generally to the construction of fishing reels, and is particularly applicable to reels suitable for line casting.

Conventional fishing reels suitable for casting make use of a line winding spool which can be arranged to turn freely to spool out the line during a casting operation. To facilitate such free spooling the manual winding handle of the reel, together with reduction gearing generally employed, is arranged whereby the same may be disconnected from the spindle of the spool. It is well known that considerable skill must be exercised during casting to prevent back lash and resulting tangling of the line. In an effort to prevent back lash it has been proposed to apply frictional braking or checking means to the spool together with manual means for adjusting the same to suit varying conditions, such as the weight of line, extent of cast, the skill of the caster, and the like. Such braking or checking means however has not been satisfactory in that it does not prevent back lash under all conditions, and if the brake is manually set to check the spool to a substantial degree, then the effective length of the cast is seriously shortened. Experienced fishermen casting with such a reel will invariably set the braking means to check the spool to only a slight extent, and will then thumb the spool to prevent back lashing the same as reels which are not provided with such braking means.

It is an object of the present invention to provide a fishing reel having improved and more effective means for preventing back lashing, and which will make possible relatively long casts without the necessity of thumbing the reel.

Another object of the invention is to provide a casting reel of the above type provided with breaking or checking means released and applied automatically, to prevent back lashing.

Additional objects of the invention will appear from the following description in which the preferred embodiment has been set forth in detail in conjunction with the accompanying drawing:

Referring to the drawing:

Figure 1 is a side elevational view showing a casting reel incorporating the present invention.

Figure 2 is an end view of the reel shown in Figure 1, looking toward the right hand end of the same.

Figure 3 is an end view of the reel shown in Figure 1, looking toward the left hand end of the same.

Figure 4 is a cross-sectional view taken along the line 4—4 of Figure 1.

Figure 5 is a cross-sectional view taken along the line 5—5 of Figure 1.

Figure 6 is a cross-sectional view taken along the line 6—6 of Figure 1.

Figure 7 is a cross-sectional view taken along the line 7—7 of Figure 1.

Figure 8 is an enlarged detail in section showing operating parts of my reel, including the parts which effect automatic braking.

Figure 9 is a cross-sectional detail taken along the line 9—9 of Figure 8.

Figures 10 and 11 are diagrammatic views serving to illustrate the mode of operation.

The present invention is characterized by braking or checking means for the spool of the reel which is automatically released during the initial part of the cast. During the final part of the cast, when back lash tends to occur, the braking means is automatically applied. The mechanism which serves to effect automatic release and application of the braking means includes a momentum member mounted in conjunction with the spool, and which assumes different angular positions with respect to the spool during a casting operation. Such relative movements of the momentum member serve to effect automatic release and application of the braking means, as will be presently described.

The reel as illustrated in the drawings consists of a line winding spool 10 carried by a body or frame which includes the annular end members 11 and 12, and the connecting and spacing rods 13. A conventional type of mounting 14 is provided for attaching the reel to a rod. A journaled stud 16 extends from one end of the reel and carries the hand lever 17. Within the end cover 18 there is a typical gear assembly 19. A pivoted hand operated lever 21 can be moved between two operating positions. In one position the gear assembly is operatively clutched to the spool, and in the other position the spool is disconnected with respect to the gearing and is free to rotate for casting.

Insofar as described above the reel corresponds to commercial designs now available on the market.

The additional mechanism which I provide in accordance with the present invention, and which mechanism cooperates with the parts described above, can best be understood by reference to Figures 8 to 11 inclusive. The spool 10 is shown in this instance as comprising the dished annular ends 26, which are attached to the central hub 27.

Extending axially through the hub 27 there is a shaft 28, the ends of which are finished to provide the projecting journal pins 29 and 31. Pin 29 is received in a suitable journal bearing (not shown) carried by the gear assembly 19. Pin 31 is journaled within a bushing 32 which is carried by the adjacent part of the reel body. A sleeve 33 is shown attached to the shaft 28 and forms a journal for the bushing 34, which in turn is fixed in the hub 27. Another bushing 36 is fixed to the hub as by means of lock pin 37, and is likewise journaled upon the adjacent portion 38 of the shaft 28. Sleeve 36 is extended to provide an internally threaded portion 39 which has threaded engagement with a threaded portion 41 of the shaft 28. Thus when relative rotation occurs between the spool and the shaft 28, longitudinal or axial movement likewise occurs, and assuming that the shaft is held against axial movement, the spool is shifted in an endwise direction.

The braking means employed utilizes a pair of members (42, 46) having surfaces adapted to be brought into frictional engagement, with one of the members being attached to the spool, and the other to the body. The one member 42 is in the form of a cylinder or drum, which has an end wall 43 which can be formed integral with the sleeve 36. Wall 43 is also shown attached to the adjacent portion of the spool by one or more screws 44. The other member 46 of the braking means is annular in form and is mounted on the body and on an axis aligned with the axis of the spool. It is desirable to permit adjustment of member 46 and therefore it has a threaded engagement 47 as illustrated with the adjacent wall 48 of the reel body. Its outer annular end portion 49 is preferably knurled as illustrated and is accessible for manual engagement through the side body openings 51 (see Figures 1 and 2). Suitable detent or locking means can be provided for holding the member 46 in its adjusted position, as for example a set screw 53 (Figure 8) which is adapted to engage one end face of the member 46.

The members 42 and 46 are machined to provide the conical shaped friction surfaces 54 and 56. These surfaces are either separated or brought into frictional engagement by endwise movement of the spool 10.

Suitably mounted upon the shaft 28 there is a momentum member 58 which can be in the form of a flywheel having a substantial amount of weight. Suitable means such as screws 59 serve to attach the member 58 to the annular flange 61 formed integral with the shaft 28. Member 58 occupies the annular space 62, which is enclosed by the members 42 and 46. A stop lug 63 is mounted upon the member 58 and operates between limiting stops formed by the pins or screws 64 and 66. Both of these screws are carried by the wall 43 and are therefore fixed with respect to the spool. A tension spring 67 has its one end attached to the pin or screw 66 and its other end attached to the pin or screw 68, which in turn is mounted upon the member 58. Thus the member 58 is continuously urged in a direction tending to bring lug 63 into engagement with the stop pin 64 (Figure 9). However, limited relative rotation can occur between the spool and the member 58 to an extent sufficient to bring lug 63 into engagement with the stop pin 66. It may be explained at this point that such angular movement between member 58 and the spool causes sufficient rotation between the threaded shaft portion 41 and the internally threaded sleeve 36, so that the spool is shifted a substantial distance endwise, sufficient to either separate or bring the braking surfaces 54 and 56 into frictional engagement. For the position of the parts illustrated in Figure 9 the friction surfaces are in engagement, but when lug 63 is against or adjacent to the pin 66, the friction surfaces are separated.

In Figure 8 I have shown a rotatable clutch element 71 which is driven by the gear assembly, and which upon shifting lever 21 is moved axially to establish driving relationship with the spool. I have found it desirable to provide an arrangement whereby when the clutch element 71 is engaged with the spool, the shaft 28 is held stationary with or in other words immobilized with respect to the spool, thus preventing engagement of the frictional braking surfaces 54 and 56 during manual turning of the reel. Thus the sleeve 34, which is attached to the spool hub 27 is shown provided with slots 72 for engagement by the clutch element 71. In addition the adjacent end of the sleeve 33 is likewise provided with clutch engaging slots 73, which when the lug 63 is in alignment with the engagement with pin 66 is in alignment with the slots 72. When the clutch element 71 is moved in an axial direction toward the spool by shifting the position of lever 21 and the handle 17 turned, the clutch element first engages slots 73 and then as the handle 17 is turned a further amount, slots 72 are engaged. Thereafter the parts are locked together to prevent any angular rotation between momentum member 58 and the spool, and the frictional braking surfaces 54 and 56 are locked in spaced relationship. It will be noted that the clutch end of sleeve 33 extends beyond the adjacent end of the sleeve 34. This is because it is desirable to insure engagement of the clutch element 71 with the sleeve 33 prior to engagement with the spool.

It will be evident that in the construction of my reel permissible end play of the shaft 28 should be reduced to a minimum. If desired a suitable end play adjustment can be provided.

Operation of my reel can now be explained as follows: Assuming that the line has been wound upon the spool, and that one desires to make a cast, lever 21 is swung to a position to withdraw the clutch element 71 from driving engagement with the spool and sleeve 33, or in other words to the position illustrated in Figure 8. This results in unlocking of sleeve 33 and shaft 28 with respect to the spool whereby spring 67 causes relative rotation between the spool and the momentum member to bring lug 63 in engagement with or to a position adjacent to stop pin 64. Thus the frictional surfaces 54 and 56 are brought into frictional engagement. The cast is commenced in the same manner as with conventional reels, in other words the spool is held stationary by the thumb for the initial throwing action of the rod, and then the spool is released to permit free running to allow the weighted end of the line to commence its trajectory. The instant the spool is released it is accelerated to a speed dependent upon the intensity of the cast, and to permit free run-out of the line. Shaft 28 together with weight 58 must necessarily rotate together with the spool, but because of the initial acceleration there is an initial lag in the angular relationship between these parts with a stretching of spring 67, such that lug 63 is moved toward or brought into engagement with the pin 66. Such angular movement necessarily causes endwise movement of the spool as previously described, whereby the frictional surfaces 54 and 56 are separated to permit free running of the spool. Thus although the automatic braking means is engaged when the spool is stationary before commencing the cast, it is automatically released immediately as the spool commences its acceleration.

During the main part of the cast, while the line is running out, the angularity between the member 58 and the spool remains such that the frictional surfaces 54 and 56 are held out of engagement. However, near the end of the cast (at the time when one would commence to check the spool by thumbing with reels of conventional construction) the member 58 has in effect caught up with the spool under the urge of spring 67, thereby bringing the surfaces 54 and 56 into frictional engagement. Such frictional engagement does not immediately arrest rotation of the spool, but simply checks rotation in the same manner as an operator might check rotation of the spool with the thumb. Checking automatically applied in the manner described serves to prevent over-running of the spool with resulting back lash.

The operation described above can be better understood by reference to diagrammatic Figures 10 and 11. Figure 10 illustrates the frictional surfaces 54 and 56 separated as during a cast and before the braking means has been applied. Two points located respectively upon the momentum member 58 and the spool are shown shifted with respect to each other in an amount equal to the angle $a$. This is the so-called lag which occurs between these parts at the commencement of a cast. Figure 11 shows this angularity reduced to zero as at the end of a cast, and at this time the frictional surfaces 54 and 56 are in engagement.

To facilitate the foregoing description, reference has been made to movement of the lug 63 between the limits of stop pins 64 and 66. Actually however the full angular movement between the parts is generally limited to a somewhat smaller angle, depending upon the exact setting of the member 46. Adjustment of this member may be made when required to compensate for wear between the frictional surfaces 54 and 56.

A feature of the invention is that no adjustment need be made to adapt the reel to casts of varying lengths. In other words either long or short casts can be made with equal effectiveness of the automatic braking means.

I claim:

1. In a fishing reel of the casting type having a line spool journaled in a body and clutch means to selectively engage manual means for winding the spool, the improvement comprising releasable braking means for frictionally checking free rotation of the spool, means including a momentum member actuated during a line casting operation to release said braking means at the commencement of a cast and to automatically apply the same near the end of a cast to prevent backlash, and means whereby the clutch means locks said braking means in disengaged position when the clutch is engaged.

2. In a fishing reel of the casting type having a line spool journaled in a body, a momentum member having substantial weight and journaled concentric with the spool, a spring forming a connection between the spool and said momentum member whereby said momentum member and the spool are caused generally to rotate together during a casting operation but whereby during the initial part of a cast said momentum member is caused to have angular lag relative to the spool and against the tension of such spring, releasable braking means for checking free rotation of the spool, said braking means including an annular member carried concentric and adjacent the body journal and having a conical friction braking surface, and another annular member carried by the spool and having a conical friction surface adapted to be brought into engagement with said first named friction surface, the spool being journaled relative to the body whereby the same has limited axial movement to bring said conical frictional surfaces into and out of engagement, said last named annular member generally embracing said momentum member, and mechanism connecting said momentum member to said spool to move said spool axially in response to angular movement between said momentum member and the spool, the cooperation of the parts being such that at the beginning of a cast said momentum member has angular lag with respect to the spool to cause the spool to be positioned axially to separate said frictional braking surfaces, and whereby near the end of the cast the spring means connecting the momentum member with the spool causes rotation of the momentum member to eliminate said angular lag whereby said spool is moved axially to bring said frictional braking surfaces into engagement to thereby check free rotation of the spool.

3. In a fishing reel of the casting type having a line spool journaled in a body, a momentum member having a substantial weight and journaled concentric with the spool, a spring forming a connection between the spool and said momentum member whereby said momentum member and the spool are caused generally to rotate together during a casting operation but whereby during the initial part of a cast said momentum member is caused to have angular lag relative to the spool and against the tension of said spring, releasable braking means for checking free rotation of the spool, said braking means including an annular member carried concentric and adjacent the body journal and having a conical friction braking surface and another annular member carried by the spool and having a conical friction surface adapted to be brought into engagement with said first named friction surface, the spool being journaled relative to the body whereby the same has limited axial movement to bring said conical frictional surfaces into and out of engagement, mechanism connecting said momentum member to said spool to move said spool axially in response to angular movement between said momentum member and the spool, the cooperation of the parts being such that at beginning of a cast said momentum member has angular lag with respect to the spool to cause the spool to be positioned axially to separate said frictional brakeage surfaces, and whereby near the end of the cast the spring means connecting the momentum member with the spool causes rotation of the momentum member to eliminate said angular lag whereby said spool is moved axially to bring said frictional braking surfaces into engagement to thereby check free rotation of the spool, and manual means for winding the spool and comprising a clutch element movable into engagement with both the spool and said momentum member and serving to lock said frictional surfaces in released position when so engaged.

4. In a fishing reel of the casting type having a line spool journaled in a body, a momentum member having substantial weight and journaled concentric with the spool, a tension spring permanently attached to circumferentially spaced points on the spool and said momentum member whereby said momentum member and the spool are caused generally to rotate together during a casting operation but whereby during the initial part of a cast said momentum member is caused to have angular lag relative to the spool and against the tension of said spring, stop elements provided on said momentum member and the spool to arrest rotation of the momentum member in one direction relative to the spool, the tension of the spring serving to rotate the momentum member in a direction to cause the stop elements to be engaged, releasable braking means for checking free rotation of the spool, said braking means including an annular member adjustably carried by the body concentric with the axis of the spool and adjustable in an axial direction toward or away from one end of the spool, said member having a conical friction braking surface, said braking means also including another annular member secured to the spool and having a conical friction surface adapted to be brought into frictional engagement with said first named friction surface, the spool being journaled relative to the body whereby the same has limited axial movement to bring said conical frictional surfaces into and out of braking engagement, and mechanism connecting said momentum member to said spool to move said spool axially in response to angular movement between said momentum member and the spool, the cooperation of the parts being such that at the beginning of a cast said momentum member has angular lag with respect to the spool to cause the spool to be positioned axially to separate said frictional braking surfaces, and whereby near the end of the cast the spring means connecting the momentum member with the spool causes rotation of the momentum member to eliminate said angular lag whereby said spool is moved axially to bring said frictional braking surfaces into engagement to thereby check free rotation of the spool.

CLYDE L. HUNSICKER.

REFERENCES CITED

The following references are of record in the file of this patent:

UNITED STATES PATENTS

| Number | Name | Date |
|---|---|---|
| 1,456,283 | Schmid | May 22, 1923 |
| 2,120,334 | Lauterbach | June 14, 1938 |
| 2,198,231 | Schafer | Apr. 23, 1940 |
| 2,324,324 | Rutledge | July 13, 1943 |
| 2,520,552 | Kilian | Aug. 29, 1950 |